C. H. NEWTON.
VALVE REMOVER.
APPLICATION FILED APR. 5, 1919.
1,314,355.
Patented Aug. 26, 1919.
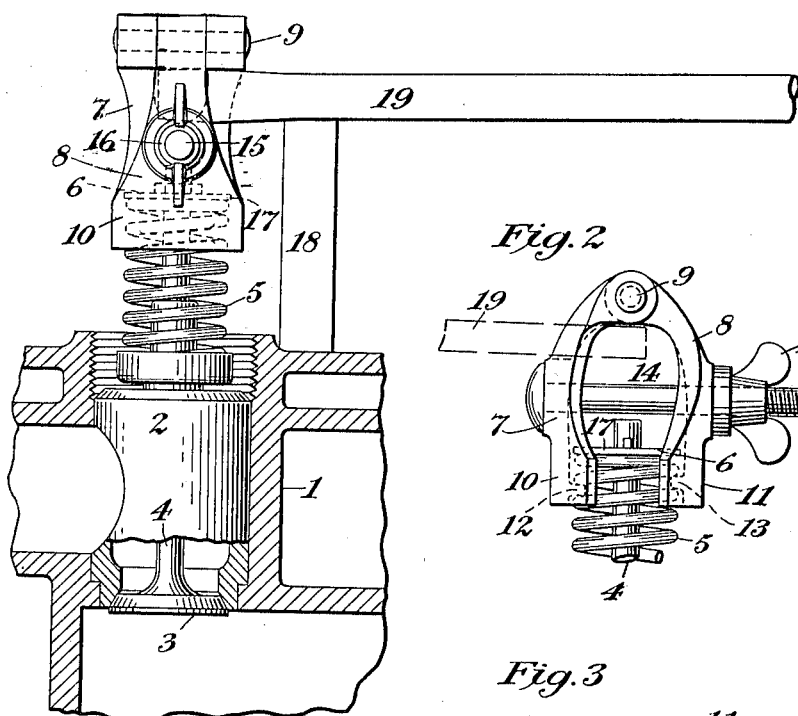
INVENTOR
Charles H. Newton.
BY
Andrew Wilson
ATTORNEY

UNITED STATES PATENT OFFICE.

CHARLES H. NEWTON, OF PLAINVILLE, CONNECTICUT.

VALVE-REMOVER.

1,314,355.  Specification of Letters Patent.  Patented Aug. 26, 1919.

Application filed April 5, 1919. Serial No. 287,887.

*To all whom it may concern:*

Be it known that I, CHARLES H. NEWTON, a citizen of the United States, and resident of Plainville, in the county of Hartford and State of Connecticut, have invented certain new and useful Improvements in Valve-Removers, of which the following is a specification.

My invention relates to means for removing the valve units from explosive engines, particularly engines of the type commonly used in Buick automobiles; and my improvements are directed to means whereby the necessary mechanism is simplified and made more easy of application and more positive and direct in action, as will be hereinafter pointed out and claimed.

In the drawings Figure 1 shows a section of an engine with the valve unit in position and with one of my improved remover clamps applied ready to be operated upon by a positioned lever; Fig. 2 is a view of the remover clamp taken at right angles to Fig. 1, and indicating by broken lines the position in which a lever may be applied to it, the lower ends of the valve stem and spring being broken away; and Fig. 3 is a bottom view of Fig. 2, the lever being omitted.

The engine casing 1, and valve unit 2 with its valve 3, valve stem 4, spring 5 and keyed washer 6 are of the usual construction, and require no special explanation. The remover clamp embodies two arms 7 and 8, pivoted together by a pin 9, provided with concaved jaws 10, 11, and having cross ribs 12, 13 accommodated to the coils of the spring 5 and adapted to enter therebetween. The arm 7 is provided with an opening between its pivot lugs, shown by broken lines in Fig. 1, and suitable to permit of the introduction of the end of a lever thereinto so as to bear upward below the pivot pin 9 as shown in Fig. 2. And the arms 7 and 8 are so proportioned as to leave between them an opening 14 suitable to receive the end of a lever to bear upward toward the pivot pin 9 as shown in Fig. 1.

The arms 7 and 8 are clamped toward each other by means of a suitable bolt 15 and wing nut 16, which permits the arms to be spread when the nut is slackened away, and draws them forcibly together when the nut is screwed down on the bolt. This bolt 15 is so positioned in the jaws that it will clear the top of the valve stem 4 when the clamp is applied to the spring 5, and will also have ample space above it in the clamp for the insertion of the end of a lever, as already mentioned.

To use my improved valve remover, the arms are spread so as to straddle down over the end of the valve stem and spring, and the jaws are then clamped toward each other so as to force their ribs 12, 13 in between the coils of the spring, the adjustment being made as near as may be deemed best to the washer 17 on the valve stem.

A suitable fulcrum, as 18, is then provided, and on this is rested a lever 19 the end of which is made to enter between the arms 7 and 8 as in Fig. 1, or between the lugs of the arm 7 as in Fig. 2. As much pressure as may be necessary to remove the valve unit can then be applied to the remover clamp through the lever 19, the stress being exerted directly in line with the valve stem and without bending or tarving to one side or the other and without distortion of the remover clamp or of the valve stem or valve clamp. It sometimes happens that the valve unit is very firmly attached, by the heat and products of combustion, to the engine casing, so that it will withstand a very severe steady strain. And in that case it is desirable to give the valve unit a sharp, quick jar so as to break the connection between it and the engine casing. In my arrangement this can readily be done by a sharp blow on the long arm of the lever, which will deliver its shock upwardly through the remover clamp and materially assist in freeing the valve unit from the engine.

My device is simple, compact and efficient; it is readily applicable in the limited space found in Buick engines; it is adapted to receive a lever from three directions; and it is not necessary to provide a special lever handle for it, but use can be made of such suitable tools or levers as are usually at hand in garages and repair shops.

Having thus described my invention, what I claim and desire to secure by Letters Patent of the United States is:—

1. In a valve unit remover the combination of a pair of pivoted arms, one thereof being provided with a transverse lever-receiving opening, a lever seat formed between the arms directly below the pivot, the lower ends of said arms being provided with concaved jaws having transverse ribs therein, and means, consisting of a bolt and nut for clamping said arms toward each other.

2. In a valve unit remover the combination of a pair of pivoted arms, one thereof being provided with a transverse lever-receiving opening, a lever seat formed between the arms directly below the pivot and adapted to receive a lever from either side to exert a direct upward pressure centrally beneath the pivot, the lower ends of said arms being provided with concaved jaws having transverse ribs therein, and means, consisting of a bolt and nut for clamping said arms toward each other.

CHARLES H. NEWTON.

Copies of this patent may be obtained for five cents each, by addressing the "Commissioner of Patents, Washington, D. C."